Figure 1:
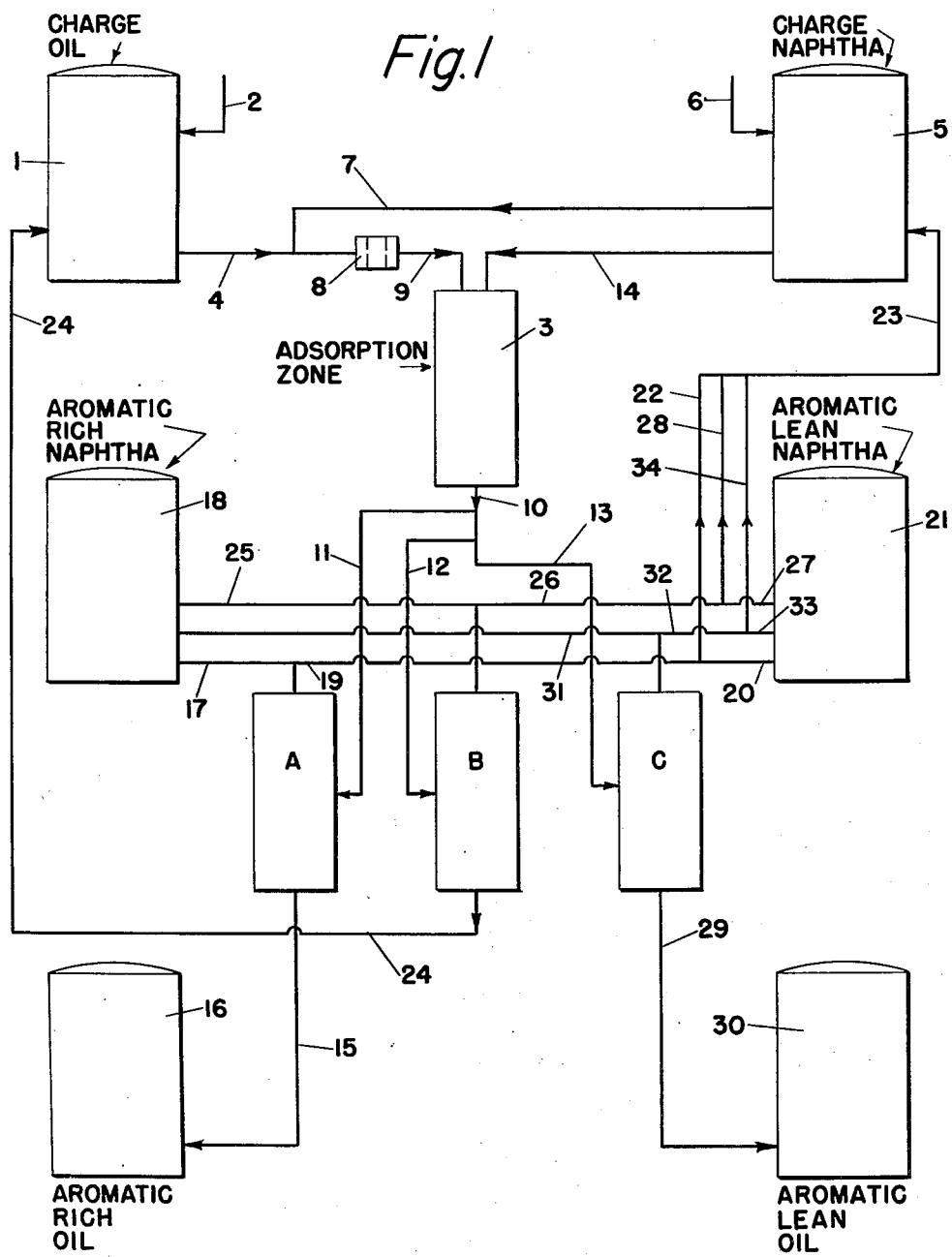

Nov. 27, 1951 — M. R. LIPKIN — 2,576,525
PROCESS FOR SEPARATING HYDROCARBON FRACTIONS CONTAINING AROMATICS
Filed Feb. 25, 1948 — 2 SHEETS—SHEET 2

INVENTOR.
MOSES ROBERT LIPKIN
BY
Busser and Harding
ATTORNEYS

Patented Nov. 27, 1951

2,576,525

UNITED STATES PATENT OFFICE 2,576,525

PROCESS FOR SEPARATING HYDROCARBON FRACTIONS CONTAINING AROMATICS

Moses Robert Lipkin, Philadelphia, Pa., assignor to Sun Oil Company, Philadelphia, Pa., a corporation of New Jersey Application February 25, 1948, Serial No. 10,664

9 Claims. (Cl. 260—674)

This invention relates to adsorption of hydrocarbons and particularly to the selective adsorption of aromatic hydrocarbons from composite liquid hydrocarbon mixtures. The invention more especially is directed to a cyclic process wherein aromatic hydrocarbons are separated or concentrated from hydrocarbon mixtures, such as petroleum fractions, by means of a silica gel adsorbent and the adsorbent is regenerated for reuse in each cycle of operation.

The selective removal of aromatics from other hydrocarbons by adsorption on silica gel is well known. The main difficulty in practicing such procedure resides in the regeneration of the silica gel so that it may be reused in the process. It is desirable that the regeneration be effected at ordinary or ambient temperature without the use of expensive solvents, hot gases, steam or the like.

In one aspect the present invention comprises a cyclic process in which aromatics adsorbed from a hydrocarbon charge are displaced from the silica gel, and the gel is thereby regenerated for further separation of aromatics from such charge, by means of another hydrocarbon material which is composed of both aromatic and saturate hydrocarbons and which boils outside of the boiling range of the aforesaid hydrocarbon charge. For example, the hydrocarbon charge may comprise a petroleum fraction of a given boiling range and the other hydrocarbon material may comprise another petroleum fraction also containing aromatics but having a boiling range outside of the boiling range of the first fraction, being either higher or lower boiling. The saturate hydrocarbon components of the second fraction will travel through the adsorbent faster than the aromatic components and will function to displace those saturate hydrocarbons from the first fraction which have remained in the adsorbent along with the aromatics therefrom. The saturate components of the second fraction also tend to desorb and force out the adsorbed aromatics to an extent, but this occurs to a lesser degree than the displacement of the saturates. Accordingly, a further separation is effected between the aromatic and non-aromatic components of the first fraction as the second fraction displaces the first fraction material from the gel bed. The aromatic hydrocarbons of the second fraction progress through the bed more slowly than the saturates and serve to displace first fraction aromatics which have not been previously desorbed by the saturates.

In another aspect the invention comprises a cyclic process wherein during each cycle two aromatic-containing hydrocarbon charge fractions having different boiling ranges are successively filtered through the silica gel to selectively separate aromatics from each. Each charge acts as a desorbing or displacing agent for the other and serves to regenerate the adsorbent for treatment of the other charge. By collecting the filtrate in a plurality of suitable separate cuts and then distilling the cuts separately to remove the lower boiling from the higher boiling hydrocarbons, each charge may be separated into an aromatic-rich product and an aromatic-lean product. As a general rule, certain intermediate products will be obtained which will approximate the compositions of the charge materials and which may be recycled for retreatment in the process.

The charge materials for the process may be any two composite hydrocarbon fractions which have substantial aromatic contents and which have boiling ranges that are different so that hydrocarbons from the lower boiling fraction may be removed from the higher boiling aromatics by distillation. Examples of such materials are lubricating oil and gasoline, lubricating oil and kerosene, gas oil and gasoline, or two naphtha fractions of different boiling ranges, for instance a 250–300° F. naphtha and a 350–400° F. naphtha. The charge materials may be derived from petroleum, coal tar or other analogous sources and may include olefinic hydrocarbons. Generally, the aromatic contents of the charge materials should be within the range of 5–90% by volume and preferably within the range of 10–80%.

When a charge material is used that boils above about 500° F., it is desirable first to dilute the charge with a lower boiling hydrocarbon fraction in order to obtain improved results. The diluent in such case serves to decrease the viscosity of the charge, thereby facilitating the filtration and adsorption. It may also improve the selectivity of the silica gel for aromatics by exerting an anti-solvent effect on the aromatics contained in the charge without a corresponding effect on the saturates. As the diluent, a saturate hydrocarbon such as pentane, isopentane, cyclopentane, hexane, isohexanes, cyclohexane, etc. or a mixture of such saturate hydrocarbons such as petroleum ether are particularly suitable. It has also been found that the diluent may even be a portion of the lower boiling aromatic-containing charge. For example, if the higher boiling charge is a lubricating oil fraction and the lower boiling charge a naphtha fraction, an improvement may be effected by diluting the lubricating oil with a portion of the naphtha and then charging the mixture to the silica gel, in which case aromatics from both the lubricating oil and the diluent naphtha will be adsorbed more or less simultaneously and will be subsequently displaced more or less simultaneously. Due to the difference in boiling points, the aromatics may be separately recovered by distillation of the filtrate. The proper proportion of diluent to be employed will vary with the charge material but generally should be within the range of 20–80% by volume of the charge-diluent mixture.

In a further embodiment of the process, a saturate hydrocarbon liquid may be separately introduced and filtered through the adsorbent immediately after either or both of the charge fractions. If the saturate hydrocarbon liquid is introduced immediately after the higher boiling charge, a more effective separation of such charge into aromatic and non-aromatic components will result; while if it is introduced immediately after the lower boiling charge, the latter will be more effectively separated into aromatic-rich and aromatic-lean fractions. Where it is desired to improve the separation of both charges, saturate hydrocarbon liquid may be introduced into the adsorbent zone following the introduction of each charge material. The saturate hydrocarbon liquid employed may, as in the case of the diluent referred to above, be any liquid paraffin, cycloparaffin or mixture of such hydrocarbons which has a boiling point or boiling range lying outside of the boiling ranges of both of the charge materials, so that it may be readily separated by distillation from the charge hydrocarbons with which it will be admixed after the filtration. Generally, it is desirable to use a relatively low boiling saturate hydrocarbon liquid, for example, a C$_5$ fraction, but saturates which boil intermediate of the two charge materials or even higher then either charge may also be used. The amount of saturate hydrocarbon material to be employed may vary widely dependent upon the particular charge materials used and the degree of separation desired. In any case where the process is practiced in this manner, a sufficient amount of saturate hydrocarbon should be employed to effect substantial displacement of the charge saturates retained in the bed and cause substantial further separation of the same from the adsorbed aromatics.

Figure 2:
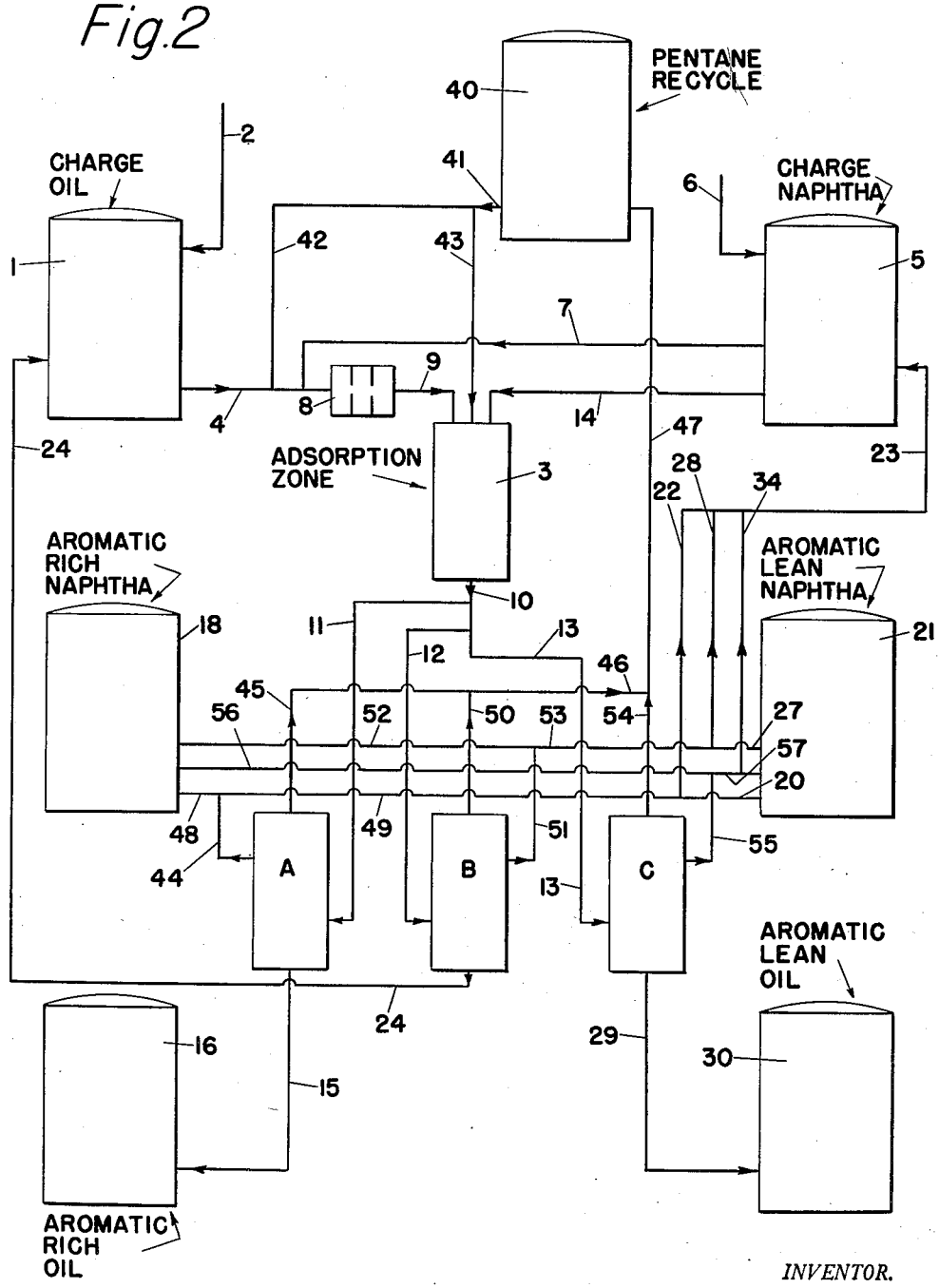

In the accompanying drawings, Figure 1 is a diagrammatic flowsheet for practicing one form of the invention and Figure 2 is another illustrative flowsheet of the process employing a saturate hydrocarbon liquid which may be introduced into the adsorption zone after either or both of the charge materials. For purposes of simplicity pumping and valve arrangements have been omitted from the flowsheets but it will be understood that suitable provisions for these should be made.

Referring first to Figure 1, the charge materials will be considered for purpose of illustration as a lubricating oil and a naphtha fraction. A body of charge oil is maintained in tank 1 which may be supplied with the lubricating oil to be treated from an outside source through line 2. Numeral 3 represents an adsorption zone such as a column packed with silica gel. In each cycle of operation charge oil is first introduced through line 4 to adsorption zone 3 and is permitted to percolate through the bed of silica gel to selectively adsorb aromatics. In one form of operation the charge oil may be introduced directly into adsorption zone 3 without being previously admixed with diluent, while in another form of operation a portion of the naphtha, which has been supplied to naphtha tank 5 by means of line 6, may be withdrawn from tank 5 through line 7 and admixed with the charge oil in a suitable mixer 8 such as an orifice type mixer, before introduction through line 9 into the adsorption zone. Filtrate from the adsorption zone flows through line 10 and may be sent by means of lines 11, 12 or 13 to any one of the three distillation zones designated as A, B and C, which are provided for separation of the naphtha hydrocarbons in the filtrate cuts from the charge oil hydrocarbons.

After sufficient charge oil or mixture of charge oil and diluent has been added to adsorption zone 3, flow of the same is discontinued and charge naphtha is introduced from tank 5 through line 14 into the adsorption zone. As previously explained, the saturate components of the charge naphtha tend to travel faster through the adsorbent bed than the naphtha aromatics due to the lower degree of adsorbability of the saturates and therefore tend to displace charge oil saturates from the adsorption zone ahead of the charge oil aromatics. The latter are then substantially completely displaced from the zone as the naphtha aromatics travel through the bed.

After sufficient naphtha has been added the introduction of naphtha is stopped and charge oil is again introduced from tank 1 through line 4, mixer 8, and line 9 into the adsorption zone, thus beginning a new cycle of operation. The naphtha aromatics adsorbed on the gel from the previous cycle are then displaced by the charge oil aromatics introduced during the new cycle. There is also a further separation of naphtha saturates from naphtha aromatics due to the fact that the charge oil saturates tend to travel through the gel at a faster rate than the charge oil aromatics and thus tend to preferentially wash out naphtha saturates which have been retained in the bed along with the adsorbed aromatics.

During each cycle the filtrate from adsorption zone 3 is separated into a plurality of suitable cuts which are separately distilled in distillation zones A, B and C. For purpose of illustration, it is considered that the filtrate is divided into three separate cuts, one containing a high proportion of charge oil aromatics, another containing a low proportion of such aromatics and an intermediate fraction in which the proportion of the charge oil hydrocarbons approximates that of the charge oil; but it will be understood that any desired number of filtrate cuts may be taken.

The cut which includes the aromatic-rich oil is sent through line 11 to distillation zone A and is therein distilled to remove naphtha hydrocarbons as an overhead product, the aromatic-rich oil being withdrawn from the bottom of the distilling zone through line 15 and sent to the aromatic-rich oil product tank 16. The composition of the naphtha hydrocarbons removed from the top of distillation zone A may vary considerably. In some cases this material may constitute the aromatic-rich naphtha product, in which case it will be sent through line 17 to product tank 18. In other cases this material may be the aromatic-lean naphtha product in which case it will be sent through lines 19 and 20 to product tank 21. In still other cases the overhead product from distillation zone A may approximate the charge naphtha in composition in which case it may be returned to naphtha tank 5 by means of lines 19, 22 and 23. The composition of the naphtha hydrocarbons from distillation zone A will depend upon the particular procedure by which the process is being operated, the charge materials employed and the amounts introduced during each cycle, whether or not a diluent is admixed with the high boiling charge, the particular diluent used, the amount of diluent employed, etc.

The filtrate cut containing the intermediate oil fraction is passed through line 12 to distillation zone B wherein it is likewise separated to remove naphtha hydrocarbons as an overhead product. The charge oil hydrocarbons which approximate the composition of the charge oil are withdrawn from the bottom of distillation zone B and are recycled through line 24 back to charge oil tank 1. The naphtha hydrocarbons obtained from this zone again may be either the aromatic-rich naphtha product, aromatic-lean naphtha product or may approximate the composition of the charge naphtha, dependent upon such factors as mentioned above. In case this material is the aromatic-rich product it may be sent through line 25 to tank 18, or if it is the aromatic-lean product it may be passed to tank 21 by means of lines 26 and 27. Where the material approximates the charge naphtha in composition it may be recycled by means of lines 26, 28 and 23 to naphtha tank 5 for reuse.

The filtrate cut containing the aromatic-lean oil is sent through line 13 to distillation zone C and is similarly distilled. The aromatic-lean oil is withdrawn through line 29 and is passed into product tank 30. The overhead naphtha product from zone C is also subject to variation in composition. Where it constitutes the aromatic-rich naphtha product, it is sent through line 31 to tank 18. Where it constitutes the aromatic-lean naphtha product, it is passed through lines 32 and 33 to aromatic-lean naphtha tank 31. In case it is of such composition as to be suitable for recycling, it is passed through lines 32, 34 and 23 to charge naphtha tank 5.

Referring now to Figure 2 in which numerals identical to those of Figure 1 have been used to identify identical parts of the process, charge oil is first introduced in each cycle from tank 1 into adsorption zone 3. In this case the charge oil may first be diluted either with charge naphtha introduced from tank 5 through line 7 into the charge oil or with a saturate hydrocarbon liquid drawn from recycle tank 40 through lines 41 and 42. For purpose of illustration such saturate hydrocarbon liquid is referred to in the present description as pentane. As previously indicated the pentane will facilitate the filtration operation and will improve the selectivity of the silica gel for the charge oil aromatics.

After introduction of the charge oil or mixture of the charge oil and diluent, charge naphtha from tank 5 may be immediately passed through line 14 into the adsorption zone. As an alternative procedure the charge oil may be followed first by pentane which is introduced directly into the adsorption zone through lines 41 and 43, and the charge naphtha may then be introduced into the zone immediately after the pentane. The introduction of pentane after the charge oil will cause a more efficient separation of the charge oil hydrocarbons by preferentially displacing charge oil saturates from the adsorbed aromatics.

Following the introduction of the charge naphtha through line 14 into the adsorption zone, charge oil may be immediately passed again into the zone to begin a new cycle of operation. A further alternative procedure comprises introducing pentane from tank 40 through lines 41 and 43 into the adsorption zone immediately following the charge naphtha and subsequently introducing the charge oil after the pentane. The use of pentane at this point will cause a more efficient separation of the naphtha hydrocarbons by preferentially washing out the naphtha saturates ahead of the naphtha aromatics.

The efflux stream flowing from adsorption zone 3 through line 10 is split, similarly as in the process of Figure 1, into a plurality of cuts which are separately distilled in distillation zones A, B and C. In the present case each of the distillations are conducted to separate the filtrate fractions into three portions, namely the oil hydrocarbon portion, the naphtha hydrocarbon portion and pentane. Thus in distillation zone A, aromatic-rich oil is withdrawn from the bottom of the zone, naphtha hydrocarbons are withdrawn as a side stream product by means of line 44 while the pentane is removed overhead through line 45. The pentane is recycled by means of lines 46 and 47 back to tank 40 for reuse. The naphtha hydrocarbons from line 44 may be sent, depending upon the composition, through line 48 to tank 18, or lines 49 and 20 to tank 21, or through lines 49, 22 and 23 to charge naphtha tank 5 for reuse.

From distillation zone B the intermediate oil fraction is obtained as a bottom product and may be returned through line 24 to charge oil tank 1. Pentane is removed overhead through line 50 and is recycled through lines 46 and 47 for reuse. The side stream naphtha hydrocarbons are removed through line 51 and, again depending on composition, may be sent through line 52 to the aromatic-rich naphtha tank 18 or through lines 53 and 27 to tank 21, or through lines 53, 28 and 23 to tank 5.

From distillation zone C aromatic-lean oil is removed from the bottom, and pentane is removed overhead through line 54 whence it returns to the pentane recycle tank 40. Naphtha hydrocarbons are withdrawn through line 55 and may pass through line 56 to tank 18 or line 57 to tank 21 or may be recycled through lines 57, 34 and 23 to the charge naphtha tank.

The following examples in which parts are by volume unless otherwise stated are illustrative:

*Example I*

A column having an I. D. of 1.91" was packed to a height of about 30" with 1030 g. of 28–200 mesh silica gel. The charge materials to be treated were a lubricating oil fraction and a naphtha fraction. These materials had the following properties:

| | Lubricating Oil Charge | Naphtha Charge |
|---|---|---|
| Initial B. P. ° F | 510 | 310 |
| 50 per cent B. P. ° F | 675 | 343 |
| 90 per cent B. P. ° F | 775 | 375 |
| End B. P. ° F | 830 | 410 |
| Aromatic content per cent | 35 | 19 |
| Density at 20° C | 0.914 | 0.790 |
| Refractive Index, $D^{20°C}$ | 1.5051 | 1.4413 |
| Visc. at 100° F. CS | 22.8 | |
| Visc. at 210° F. CS | 3.62 | |
| Visc. Index | −5 | |

First, 500 ml. of pentane was introduced into the column to wet the gel, followed by 2000 ml. of the charge naphtha to saturate the gel with aromatics. Three cycles of operation were then carried out in which the following amounts of charge materials were percolated through the column at approximately room temperature:

Cycle 1:
    1000 ml. of a mixture of 50% charge oil and 50% pentane
Cycle 2:
    870 ml. of a mixture of 50% charge oil and 50% pentane
    1740 ml. of charge naphtha
Cycle 3:
    870 ml. of a mixture of 50% charge oil and 50% pentane
    1740 ml. of charge naphtha The filtrates from cycles 1 and 3 were discarded, the purpose of these cycles being, respectively, to establish approximate equilibrium conditions for cyclic operation and to displace the charge hydrocarbons from cycle 2. The filtrate from cycle 2 was collected in a number of separate cuts which were then distilled to recover the pentane, the naphtha hydrocarbons and the charge oil hydrocarbons separately. The charge oil hydrocarbon products were suitably combined in order to give three main products consisting of an aromatic-lean oil, intermediate oil and an aromatic-rich oil. The naphtha hydrocarbons from the corresponding cuts were likewise combined to give three main naphtha products. The total filtrates corresponding to these combined products are designated as filtrate fractions A, B and C, and were calculated to have the compositions shown in the tabulation below. The tabulation also shows yields, aromatic contents and other properties of the oil and naphtha products.

|  | Filtrate A | Filtrate B | Filtrate C |
|---|---|---|---|
| Composition of Filtrate Fractions: |  |  |  |
|   Charge oil hydrocarbons, vols | 273 | 71 | 92 |
|   Naphtha hydrocarbons, vols | 339 | 208 | 1,192 |
|   Pentane, vols | 308 | 113 | 14 |
| Charge Oil Hydrocarbons: |  |  |  |
|   Yield, per cent of charge oil | 63 | 16 | 21 |
|   Aromatic content, per cent | 15.2 | 39.4 | 81.3 |
|   Visc. at 100° F., CS | 19.98 | 23.0 | 31.0 |
|   Visc. at 210° F., CS | 3.57 | 3.70 | 3.96 |
|   Visc. Index | 40 | 7 | −76 |
|   Density at 20° C | 0.893 | 0.913 | 0.956 |
|   Refractive Index, $n_D^{20°C}$ | 1.4898 | 1.5030 | 1.5370 |
| Naphtha Hydrocarbons: |  |  |  |
|   Yield, per cent of naphtha | 20 | 12 | 68 |
|   Aromatic content, per cent | 37.3 | 15.3 | 13.1 |
|   Density at 20° C | 0.813 | 0.787 | 0.786 |
|   Refractive Index, $n_D^{20°C}$ | 1.4569 | 1.4393 | 1.4386 |

These results show that fraction A of the filtrate contained aromatic-lean oil and aromatic-rich naphtha. Fraction B contained oil which may be considered as approximating the charge oil and could be recycled if desired. The naphtha hydrocarbons in this fraction were less aromatic than the charge naphtha but nevertheless could also be recycled if desired. Fraction C comprised the aromatic-rich oil and aromatic-lean naphtha products.

*Example II*

In this example the column of silica gel employed in Example I was used for carrying out three further cycles of operation on the same charge materials. In each cycle of operation the following amounts of charge materials were percolated successively through the column:

1740 ml. of a mixture of 50% charge oil and 50% pentane
1740 ml. of charge naphtha Filtrate cuts were taken from the second cycle and were analyzed in the same manner as in Example I. Results were as follows:

|  | Filtrate A | Filtrate B | Filtrate C |
|---|---|---|---|
| Composition of Filtrate Fractions: |  |  |  |
|   Charge oil hydrocarbons, vols | 578 | 165 | 127 |
|   Naphtha hydrocarbons, vols | 404 | 47 | 1,292 |
|   Pentane, vols | 585 | 167 | 118 |
| Charge Oil Hydrocarbons: |  |  |  |
|   Yield, per cent of charge oil | 66 | 19 | 15 |
|   Aromatic content, per cent | 21.7 | 30.6 | 77.5 |
|   Visc. at 100° F., CS | 23.43 | 22.0 | 37.22 |
|   Visc. at 210° F., CS | 3.80 | 3.65 | 4.12 |
|   Visc. Index | 19 | 16 | −132 |
|   Density at 20° C | 0.901 | 0.907 | 0.979 |
|   Refractive Index, $n_D^{20°C}$ | 1.4958 | 1.5002 | 1.5552 |
| Naphtha Hydrocarbons: |  |  |  |
|   Yield, per cent of naphtha | 23 | 3 | 74 |
|   Aromatic content, per cent | 35.6 | 24.9 | 11.9 |
|   Density at 20° C | 0.817 | 0.801 | 0.785 |
|   Refractive Index, $n_D^{20°C}$ | 1.4582 | 1.4481 | 1.4373 |

*Example III*

This example was carried out by conducting the operation, using the same adsorbent as in previous runs, through three further cycles. In each cycle the following amounts of charge materials were introduced into the column:

1740 ml. of a mixture of 50% charge oil and 50% pentane
2610 ml. of charge naphtha Products were obtained from the second cycle as in the previous example. The following results were obtained:

|  | Filtrate A | Filtrate B | Filtrate C |
|---|---|---|---|
| Composition of Filtrate Fractions: |  |  |  |
|   Charge oil hydrocarbons, vols | 473 | 295 | 102 |
|   Naphtha hydrocarbons, vols | 339 | 240 | 2,031 |
|   Pentane, vols | 502 | 348 | 20 |
| Charge Oil Hydrocarbons: |  |  |  |
|   Yield, per cent of charge oil | 54 | 34 | 12 |
|   Aromatic content, per cent | 21.3 | 34.1 | 83.5 |
|   Density at 20° C | 0.900 | 0.913 | 0.988 |
|   Refractive Index, $n_D^{20°C}$ | 1.4942 | 1.5040 | 1.5620 |
| Naphtha Hydrocarbons: |  |  |  |
|   Yield, per cent of naphtha | 13 | 9 | 78 |
|   Aromatic content, per cent | 40.2 | 11.7 | 14.4 |
|   Density at 20° C | 0.817 | 0.787 | 0.790 |
|   Refractive Index, $n_D^{20°C}$ | 1.4594 | 1.4391 | 1.4401 |

From these data it may be seen that the aromatic-lean oil was obtained in fraction A and the aromatic-rich oil in fraction C and that the naphtha product of highest aromaticity occurred in fraction A, just as in the previous examples. However, in this case the naphtha product of lowest aromaticity occurred in the intermediate fraction rather than in fraction C.

*Example IV*

This example was carried out similarly to the previous examples using the same lubricating oil charge but a naphtha charge of higher aromatic content was employed. The naphtha charge had the following properties: initial B. P.=305° F.; 50% B. P.=335° F.; 90% B. P.=365° F.; end B. P.=405° F.; aromatic content=23%; density at 20° C.=0.800; refractive index $n_D^{20°C}$=1.4489. The same batch of adsorbent as employed in the preceding examples were used, the adsorbent having undergone 27 cycles of operation prior to the present run. In the present Example III further cycles of operation were carried out in the following amounts of the charge materials were successively percolated through the adsorbent in each cycle:

1305 ml. of a mixture of 50% charge oil and 50% pentane
3045 ml. of charge naphtha The filtrate cuts from the second cycle were distilled and combined to give three main filtrate fractions as in preceding examples, with the following results:

|  | Filtrate A | Filtrate B | Filtrate C |
|---|---|---|---|
| Composition of Filtrate Fractions: |  |  |  |
| Charge oil hydrocarbons, vols. | 459 | 110 | 82 |
| Naphtha hydrocarbons, vols. | 365 | 180 | 2500 |
| Pentane, vols. | 486 | 152 | 12 |
| Charge Oil Hydrocarbons: |  |  |  |
| Yield, per cent of charge oil | 70 | 17 | 13 |
| Aromatic content, per cent | 22.8 | 43.0 | 81.0 |
| Density at 20° C | 0.886 | 0.921 | 0.983 |
| Refractive Index, $n_D^{20°\,C}$ | 1.4944 | 1.5102 | 1.5580 |
| Naphtha Hydrocarbons: |  |  |  |
| Yield, per cent of naphtha | 12 | 6 | 82 |
| Aromatic content, per cent | 46.7 | 14.6 | 21.2 |
| Density at 20° C | 0.827 | 0.788 | 0.798 |
| Refractive Index $n_D^{20°\,C}$ | 1.4671 | 1.4398 | 1.4475 |

The results show that here, as in Example III, the naphtha product of lowest aromatic content occurred in the intermediate filtrate fraction.

Example V

The same charge stocks were used as in Example I but in this case the lubricating oil charge was diluted with an equal volume of the naphtha charge prior to introduction into the column. The same column and silica gel were employed as in the previous examples. Three cycles of operation were made in each of which the following amounts of charge material were percolated successively through the adsorbent:

1305 ml. of a mixture of 50% charge oil and 50% charge naphtha
3045 ml. of charge naphtha The following results were obtained for the fractions from the second cycle:

|  | Filtrate A | Filtrate B | Filtrate C |
|---|---|---|---|
| Composition of Filtrate Fractions: |  |  |  |
| Charge oil hydrocarbons, vols. | 287 | 306 | 59 |
| Naphtha hydrocarbons, vols. | 487 | 469 | 2,080 |
| Charge Oil Hydrocarbons: |  |  |  |
| Yield, percent of charge oil | 44 | 47 | 9 |
| Aromatic content, per cent | 23.6 | 33.8 | 77.2 |
| Visc. at 100° F., CS | 24.07 | 23.94 | 33.56 |
| Visc. at 210° F., CS | 3.84 | 3.75 | 3.92 |
| Visc. Index | 16 | 0 | −127 |
| Density at 20° C | 0.901 | 0.913 | 0.980 |
| Refractive Index, $n_D^{20°\,C}$ | 1.4955 | 1.5046 | 1.5550 |
| Naphtha Hydrocarbons: |  |  |  |
| Yield, per cent of naphtha | 16 | 15 | 69 |
| Aromatic content, per cent | 26.3 | 19.7 | 17.6 |
| Density at 20° C | 0.797 | 0.792 | 0.790 |
| Refractive Index, $n_D^{20°\,C}$ | 1.4457 | 1.4424 | 1.4408 |

These results show that the aromatic-lean oil and the aromatic-rich oil occurred respectively in fractions A and C and that the aromatic-rich naphtha and aromatic-lean naphtha also occurred respectively in these fractions. The results indicate that dilution of the charge oil with the charge naphtha in place of pentane still permits a substantial separation of the oil aromatics but substantially decreases the efficiency of separation of the naphtha aromatics.

Example VI

The same charge materials were used as in Example I, but the charge oil was diluted with an equal volume of charge naphtha before being introduced to the column. Also pentane was separately introduced after the charge naphtha. 1000 g. of a fresh batch of silica gel was used in the 191" I. D. column. First, 500 ml. of pentane was introduced into the column to wet the gel, followed by 1500 ml. of a mixture of 50% charge oil and 50% charge naphtha, then by 1000 ml. of charge naphtha, and then by 1000 ml. of pentane. The purpose of these additions was to prepare the gel for the three following cycles of operation, in each of which the following amounts of charge materials were added successively to the column:

1000 ml. of a mixture of 50% charge oil and 50% charge naphtha
1000 ml. of charge naphtha
1000 ml. of pentane Filtrate cuts from the second cycle were obtained in the same manner as before, with results as follows:

|  | Filtrate A | Filtrate B | Filtrate C |
|---|---|---|---|
| Composition of Filtrate Fractions: |  |  |  |
| Charge oil hydrocarbons, vols. | 321 | 79 | 99 |
| Naphtha hydrocarbons, vols. | 365 | 240 | 895 |
| Pentane, vols. | 229 | 0 | 791 |
| Charge Oil Hydrocarbons: |  |  |  |
| Yield, per cent of charge oil | 64 | 16 | 20 |
| Aromatic content, per cent | 20.1 | 43.5 | 63.5 |
| Visc. at 100° F., CS | 22.82 | 24.68 | 29.35 |
| Visc. at 210° F., CS | 3.79 | 3.75 | 3.89 |
| Visc. Index | 28 | −13 | −64 |
| Density at 20° C | 0.898 | 0.923 | 0.952 |
| Refractive Index, $n_D^{20°\,C}$ | 1.4933 | 1.5119 | 1.5346 |
| Naphtha Hydrocarbons: |  |  |  |
| Yield, per cent of naphtha | 24 | 16 | 60 |
| Aromatic content, per cent | 14.9 | 12.0 | [1] 22.6 |
| Density at 20° C | 0.790 | 0.785 | 0.795 |
| Refractive Index, $n_D^{20°\,C}$ | 1.4393 | 1.4378 | 1.4440 |

[1] Calculated.

In this case the naphtha product of highest aromatic content occurred in fraction C rather than in fraction A as in previous examples. However, the aromaticity of this fraction was not much higher than that of the charge naphtha. The naphtha product of lowest aromatic content occurred in the intermediate fraction and was of substantially reduced aromaticity.

Example VII

The charge stocks were the same as in Example I and the batch of silica gel was the same as used in Example VI. In the present case the charge oil was diluted with an equal volume of the charge naphtha and the mixture was introduced into the column. Then pentane was added, followed by the charge naphtha alone. Three cycles of operation were conducted in each of which the following amounts of materials were added in the order named:

1000 ml. of a mixture of 50% charge oil and 50% charge naphtha
1000 ml. of pentane
1000 ml. of charge naphtha Filtrate cuts were taken as before and the compositions of cuts from the second cycle were determined. Results were as follows:

| | Filtrate A | Filtrate B | Filtrate C |
|---|---|---|---|
| Composition of Filtrate Fractions: | | | |
| Charge oil hydrocarbons, vols | 236 | 236 | 28 |
| Naphtha hydrocarbons, vols | 357 | 310 | 833 |
| Pentane, vols | 0 | 684 | 316 |
| Charge Oil Hydrocarbons: | | | |
| Yield, per cent of charge oil | 47.2 | 47.2 | 5.6 |
| Aromatic content, per cent | 24.0 | 35.0 | 81.6 |
| Visc. at 100° F., CS | 22.38 | 22.47 | 36.18 |
| Visc. at 210° F., CS | 3.73 | 3.65 | 4.01 |
| Visc. Index | 25 | 7 | −146 |
| Refractive Index, $D^{20°\,C.}$ | 1.4962 | 1.5062 | 1.5560 |
| Naphtha Hydrocarbons: | | | |
| Yield, per cent of naphtha | 23.8 | 20.7 | 55.5 |
| Aromatic content, per cent | 21.9 | 33.2 | 16.4 |
| Refractive Index, $D^{20°\,C.}$ | 1.4450 | 1.4546 | 1.4396 |

Here, the naphtha product of highest aromaticity occurred in fraction B and the one of lowest aromaticity occurred in fraction C.

Example VIII

Four further cycles were carried out with the same column of silica gel as in the previous example and again with the same lubricating oil and naphtha charge stocks. In each of these cycles the charge oil was diluted with pentane before addition to the column and the following amounts of materials were added to the column in the order listed:

1740 ml. of a mixture of 50% charge oil and 50% pentane
500 ml. of charge naphtha
2000 ml. of pentane Results on the cuts from the third cycle were as follows:

| | Filtrate A | Filtrate B | Filtrate C |
|---|---|---|---|
| Composition of Filtrate Fractions: | | | |
| Charge oil hydrocarbons, vols | 589 | 153 | 58 |
| Naphtha hydrocarbons, vols | 14 | 409 | 77 |
| Pentane, vols | 975 | 310 | 1,515 |
| Charge Oil Hydrocarbons: | | | |
| Yield, per cent of charge oil | 73.6 | 19.1 | 7.3 |
| Aromatic content, per cent | 25 | 58.1 | 70 |
| Visc. at 100° F., CS | 23.41 | 23.47 | 27.00 |
| Visc. at 210° F., CS | 3.75 | 3.58 | 3.68 |
| Visc. Index | 10 | −27 | −71 |
| Refractive Index, $D^{20°\,C.}$ | 1.4973 | 1.5211 | 1.5384 |
| Naphtha Hydrocarbons: | | | |
| Yield, per cent of naphtha | 2.8 | 81.8 | 15.4 |
| Aromatic content, per cent | 59 | 10.5 | 44.2 |
| Refractive Index, $D^{20°\,C.}$ | 1.4922 | 1.4367 | 1.4628 |

These results show that aromatic-rich naphtha occurred in both fraction A and fraction C, while fraction B contained aromatic-lean naphtha. Thus, in practicing a continuous process according to the present procedure, it is apparent that recycling of intermediate naphtha could be omitted.

Example IX

The present experiment involves a procedure wherein the relatively aromatic-lean oil product obtained from a previous cycle is further treated in a subsequent cycle to form a product of still lower aromatic content. A column of about 3″ I. D. and having a height of about 4.5′ was packed with 4000 g. of 28–200 mesh silica gel and was used to carry out four cycles of operation. The first two cycles were conducted in a manner generally analogous to the last two cycles and the present description will be directed only to the latter cycles. The charge materials for the third cycle were a lubricating oil fraction, which had previously been subjected to treatment with concentrated sulfuric acid, and a naphtha fraction, these materials having approximately the following properties:

| | Lubricating Oil Charge | Naphtha Charge |
|---|---|---|
| Aromatic content, per cent by wt | 15 | 20 |
| Density at 20° C | 0.90 | 0.789 |
| Refractive Index, $D^{20°\,C.}$ | 1.4920 | 1.4411 |
| Boiling range, ° F | 610–880 | 300–400 |

In each cycle the lubricating oil hydrocarbons were charged in admixture with petroleum ether having a boiling range of 20–40° C., and an additional amount of such petroleum ether was introduced into the column following the naphtha charge. The following amounts of materials were added during the third cycle in the order listed:

6340 ml. of mixture containing 3340 ml. (3000 g.) of charge oil and 3000 ml. of petroleum ether
2000 ml. of charge naphtha
8000 ml. of petroleum ether The filtrate from the column was collected in several separate cuts as follows:

| Cut No. | Vol., ml. |
|---|---|
| A-1 | 2,000. |
| A-2 | 50 (Used for determining refractive index). |
| A-3 | 2,000. |
| A-4 | 50 (Used for determining refractive index). |
| A-5 | 2,000. |
| A-6 | 45 (Used for determining refractive index). |
| B | (Intermediate cut). |
| C | 9,000 (Aromatic-rich oil cut). |

Cuts A-1, A-3 and A-5, which contained no naphtha hydrocarbons, were combined to give a filtrate fraction composed of relatively aromatic-lean oil and petroleum ether, and the composite fraction was returned to the column as the oil charge for cycle 4. This was followed by 2000 ml. of the charge naphtha and then by 8000 ml. of petroleum ether. The filtrate from the fourth cycle was collected in several separate cuts as follows:

| Cut No. | Vol., ml. |
|---|---|
| A-1 | 2,000. |
| A-2 | 50 (Used for determining refractive index). |
| A-3 | 2,000. |
| A-4 | 50 (Used for determining refractive index). |
| A-5 | |
| B | (Intermediate cut). |
| C | 9,000 (Aromatic-rich oil cut). |

Cuts A-1, A-3 and A-5, which were composed only of aromatic-lean oil hydrocarbons and petroleum ether, were distilled to remove the petroleum ether, and the oil hydrocarbons recovered were combined to give the final aromatic-lean oil product. This product was a water white oil, amounting to 52% of the oil originally charged in cycle 3, and had a refractive index of 1.4856 and an aromatic content less than 3% by weight.

Cut C from cycle 4 and cut C from cycle 3 were separately distilled to remove petroleum ether and to separate the naphtha and oil hydrocarbons contained therein. The combined naphtha product from these two cuts amounted to about 73% by weight of the total naphtha charged in cycles 3 and 4 and had a refractive index of 1.4450 and an aromatic content of about 27% by weight. The oil product recovered from cut 3 of cycle 3 amounted to 10.7% of the original oil charged and had an estimated aromatic content of 80%. The oil product recovered from cut C of cycle 4 amounted to 4.1% of the oil originally charged and was not analyzed.

The intermediate cuts (cuts B) from cycles 3 and 4 were combined and distilled to remove petroleum ether and to separate the naphtha and oil hydrocarbons. The naphtha product obtained had a refractive index of 1.4300 and contained only about 2% aromatics by weight. The recovered intermediate oil product had a refractive index of 1.4907 and contained 13.6% aromatics by weight.

These results show that products of very low aromaticity were obtained from both the charge oil and the charge naphtha.

In all of the above examples it is to be understood that products of higher or lower aromaticity could have been produced from both the charge oil and the naphtha by taking smaller filtrate cuts.

From the above data it is evident that the invention may be utilized for such purposes as to improve the viscosity index of lubricating oil, to produce therefrom products of high aromaticity, to form naphtha products of various solvency characteristics and the like. Numerous variations of the process are permissible within the scope of the invention and the above examples are to be considered as merely illustrative.

Having described my invention, what I claim and desire to protect by Letters Patent is:

1. A cyclic process involving successive contact of two hydrocarbon mixtures with silica gel, said hydrocarbon mixtures each being composed of aromatic and saturate hydrocarbons and each boiling outside of the range of the other, which process during each cycle comprises passing the high boiling hydrocarbon mixture in liquid phase through silica gel to preferentially adsorb high boiling aromatic therefrom while displacing low boiling aromatic remaining on the silica gel from the previous cycle, passing the low boiling hydrocarbon mixture in liquid phase through the silica gel to displace high boiling aromatic while preferentially adsorbing aromatic from the low boiling mixture, diverting successive portions of the effluent from the silica gel during each cycle as a plurality of cuts each having both high and low boiling portions corresponding generally in boiling range to the respective hydrocarbon mixture charged, at least one of which cuts is enriched with respect to aromatic and another of which is enriched with respect to saturate, in the high boiling portions thereof, and at least one of which is enriched with respect to aromatic and another of which is enriched with respect to saturate, in the low boiling portions thereof, and separately distilling said cuts to separate the low boiling and high boiling portions.

2. Method according to claim 1 wherein said high boiling hydrocarbon mixture is first admixed with a saturate hydrocarbon liquid which boils outside of the boiling ranges of both of said hydrocarbon mixtures and the resulting admixture is then passed through silica gel.

3. Method according to claim 2 wherein said saturate hydrocarbon liquid boils below the boiling range of said low boiling hydrocarbon mixture.

4. Method according to claim 1 wherein a saturate hydrocarbon liquid which boils outside of the boiling ranges of both of said hydrocarbon mixtures is separately introduced into the silica gel immediately after the introduction of each of said hydrocarbon mixtures in amount sufficient to effect substantial displacement of saturate from associated aromatic hydrocarbon.

5. Method according to claim 4 wherein said saturate hydrocarbon liquid boils below the boiling range of said low boiling hydrocarbon mixture.

6. Method according to claim 1 wherein a saturate hydrocarbon liquid which boils outside of the boiling ranges of both of said hydrocarbon mixtures is separately introduced into the silica gel immediately after the introduction of said high boiling hydrocarbon mixture in amount sufficient to effect substantial displacement of high boiling saturate from associated high boiling aromatic hydrocarbon.

7. Method according to claim 4 wherein said saturate hydrocarbon liquid boils below the boiling range of said low boiling hydrocarbon mixture.

8. Method according to claim 1 wherein a saturate hydrocarbon liquid which boils outside of the boiling ranges of both of said hydrocarbon mixtures is separately introduced into the silica gel immediately after the introduction of said low boiling hydrocarbon mixture in amount sufficient to effect substantial displacement of low boiling saturate from associated low boiling aromatic hydrocarbon.

9. Method according to claim 8 wherein said saturate hydrocarbon liquid boils below the boiling range of said low boiling hydrocarbon mixture.

MOSES ROBERT LIPKIN.

REFERENCES CITED

The following references are of record in the file of this patent:

UNITED STATES PATENTS

| Number | Name | Date |
| --- | --- | --- |
| 1,872,080 | Harris | Aug. 16, 1932 |
| 2,395,491 | Mavity | Feb. 26, 1946 |
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,449,402 | Lipkin et al. | Sept. 14, 1948 |